United States Patent [19]

Pradhan et al.

[11] Patent Number: 5,358,658
[45] Date of Patent: Oct. 25, 1994

[54] METHOD FOR MIXING LIPF$_6$ ELECTROLYTES AT ELEVATED TEMPERATURES

[75] Inventors: Bhuwon Pradhan, Santa Clara; Milton N. Golovin, San Jose; Jose Gonzales, Sunnyvale, all of Calif.

[73] Assignee: Valence Technology, Inc., San Jose, Calif.

[21] Appl. No.: 49,200

[22] Filed: Apr. 19, 1993

[51] Int. Cl.$^5$ .............................................. H01G 9/02
[52] U.S. Cl. ............................. 252/62.2; 429/191; 429/192; 429/194; 429/197
[58] Field of Search ............... 252/62.2; 429/191, 192, 429/194, 197

[56] References Cited

U.S. PATENT DOCUMENTS

| | | | |
|---|---|---|---|
| 4,654,279 | 3/1987 | Bauer et al. | 252/62.2 |
| 4,792,504 | 12/1988 | Schwab et al. | 252/62.2 |
| 4,880,714 | 11/1989 | Bowden | 429/197 |
| 4,908,283 | 3/1990 | Takahashi et al. | 429/192 |
| 4,970,012 | 11/1990 | Kuroda et al. | 252/62.2 |
| 5,030,527 | 7/1991 | Carpio et al. | 252/62.2 |
| 5,041,346 | 8/1991 | Giles | 252/62.2 |
| 5,154,992 | 10/1992 | Berberick et al. | 429/194 |
| 5,262,253 | 11/1993 | Golovin | 429/192 |

*Primary Examiner*—Prince Willis, Jr.
*Assistant Examiner*—Alan D. Diamond
*Attorney, Agent, or Firm*—Gerald F. Swiss

[57] ABSTRACT

Disclosed are methods for mixing lithium hexafluorophosphate (LiPF$_6$) salt into a solution suitable for use in preparing a solid electrolyte while inhibiting decomposition of this salt. Such solid electrolytes are useful in preparing solid electrolytic cells.

19 Claims, No Drawings

METHOD FOR MIXING LIPF$_6$ ELECTROLYTES AT ELEVATED TEMPERATURES

BACKGROUND OF THE INVENTION

Field of the Invention

This invention is directed to a method for mixing lithium hexafluorophosphate (LiPF$_6$) salt into an electrolyte solution suitable for use in preparing a solid electrolyte while inhibiting decomposition of this salt.

State of the Art

Batteries typically comprise a group of electrically connected electrolytic cells which cells individually comprise a cathode, an anode and interposed therebetween, an electrolyte. The electrolyte can be formulated as a conducting liquid solution or as a conducting solid composition each of which contains an electrolytic salt. When the electrolyte is a conducting liquid solution, the resulting battery containing such electrolytic cells is often referred to as a "liquid" battery; and when the electrolyte is a conducting solid composition, the resulting battery containing such electrolytic cells is often termed a "solid" battery.

The electrolytic cells of solid batteries typically employ an anode comprising lithium and, accordingly, the electrolytic salt employed in the electrolyte of such solid batteries is a typically a lithium salt. Suitable lithium salts for use in such solid batteries containing a lithium anode are well known in the art and include, by way of example, LiI, LiBr, LiSCN, LiClO$_4$, LiBF$_4$, LiPF$_6$, LiAsF$_6$, CF$_3$CO$_2$Li, CF$_3$SO$_3$Li, and the like, however, LiAsF$_6$ is conventionally employed in such solid batteries.

The solid electrolyte is conventionally prepared by combining a prepolymer, the LiAsF$_6$ salt and optionally, a film forming agent such as polyethylene oxide into an electrolyte solvent wherein the resulting solution is mixed until all of the components are dissolved. The resulting electrolyte solution is then coated onto the surface of a substrate (e.g., the cathode or anode) and then cured so as to polymerize the prepolymer which converts the composition from a liquid to a solid thereby forming a solid electrolyte.

While the solid electrolyte prepared by such conventional techniques provides for electrolytic cells useful in generating a solid battery, the use of LiAsF$_6$ as the electrolytic salt in solid electrolytes is particularly disadvantageous because this salt is toxic and this toxicity raises environmental concerns regarding the safe disposal of spent solid batteries containing this salt.

Partly to avoid this problem, this invention employs LiPF$_6$ as the electrolytic salt because this salt is less toxic than LiAsF$_6$ and provides for improved capacity (improved cycle life) and approximately the same conductivity as compared to LiAsF$_6$. See, for example, U.S. patent application Ser. No. 08/049,212 filed concurrently herewith as Attorney Docket No. 1256 and entitled "Compositions and Methods for Improving the Cumulative Capacity of Solid, Secondary, Electrolytic Cells", which application is incorporated herein by reference in its entirety.

However, in preparing solid electrolytes containing LiPF$_6$, it was found that the addition of the LiPF$_6$ into the electrolyte solvent was accompanied by a temperature increase in the solvent due to the heat of solvation of this salt which typically increased the temperature of the mixture. Moreover, it was further found that this temperature increase and/or the application of heat during mixing was sufficient, in some cases, to decompose a significant portion the LiPF$_6$ salt which was evidenced by a change in the color of the clear solution through a straw yellow to a dark brown. Without being limited by any theory, it is believed that this decomposition reaction proceeds as follows:

$$LiPF_6 \xrightarrow{\Delta} LiF + PF_5$$

It is further believed that the so generated PF$_5$ can react with any ethers contained in the solution (e.g., the polyethylene oxide film forming agent and the electrolyte solvent if the solvent contains ether bonds) by breaking the ether bonds and causing further degradation of the electrolyte solution.

On the other hand, some heat is required in the process of combining the components used to prepare the solid electrolyte because the polyethylene oxide film forming agent typically softens (melts) at a temperature of about 55° C. to 65° C. and softening of the polyethylene oxide is required to initiate its dissolution into the electrolyte solvent.

In the past, liquid electrolyte solutions have avoided the thermal instability problems of LiPF$_6$ by first complexing the LiPF$_6$ with dimethoxyethane (DME), isolating the resulting adduct, and then using this adduct to form the liquid electrolyte solution. See, for example, Bowden, U.S. Pat. No. 4,880,714. Apparently, by first complexing with DME, the heat of solvation can be controlled. However, liquid electrolyte solutions do not employ polyethylene oxide film forming agents and this approach does not solve the problem of solubilizing the polyethylene oxide film forming agent without causing significant decomposition of the lithium hexafluorophosphate salt.

In view of the above, the inventors were confronted with a problem that formulating the solution used to prepare the solid electrolyte composition required heat to dissolve the polyethylene oxide film forming agent used in this solution and that this heat would, in some cases, also decompose the lithium hexafluorophosphate salt.

SUMMARY OF THE INVENTION

This invention is directed to a method for forming an electrolyte solution containing LiPF$_6$ salt which solution is suitable for use in forming a solid electrolyte composition wherein decomposition of this salt is inhibited during solution formation. In particular, this invention is directed to the novel and unexpected discovery that a solution containing an electrolyte solvent, a prepolymer and dissolved polyalkylene oxide film forming agent but not the lithium hexafluorophosphate salt can be cooled to a temperature below the temperature required to dissolve the polyalkylene oxide film forming agent into the solution containing electrolyte solvent and prepolymer without precipitation of the film forming agent. Surprisingly, the resulting solution can maintain the film forming agent in solution at this temperature for a period of up to about 24 hours.

This invention is further directed to the discovery that, after dissolution of the polyalkylene oxide film forming agent into the electrolyte solvent and cooling of the resulting solution to a temperature below 55° C., the LiPF$_6$ salt can be added to this solution under controlled temperature conditions wherein decomposition of the $LiPF_6$ salt is inhibited as evidenced by the lack of a change in color of the solution. Upon addition of the $LiPF_6$ salt, the resulting electrolyte solution can be maintained at this temperature up to about 168 hours without the polyalkylene oxide film forming agent precipitating from solution and this provides ample time to form the solid electrolyte composition.

Accordingly, in one of its method aspects, this invention is directed to a method for preparing an electrolyte solution comprising an electrolyte solvent, a polyalkylene oxide film forming agent, a prepolymer and $LiPF_6$ salt while inhibiting decomposition of the $LiPF_6$ salt which method comprises the steps of:

(a) combining the electrolyte solvent and the prepolymer and mixing until homogeneous;

(b) adding the polyalkylene oxide film forming agent to the composition prepared in step (a) above and mixing until a substantially uniform dispersion is formed;

(c) heating the composition at a temperature above 55° C. until the polyalkylene oxide is dissolved;

(d) cooling the composition prepared in step (c) to a temperature above the precipitation point for the polyalkylene oxide film forming agent and less than about 55° C.; and (e) adding the $LiPF_6$ to the composition prepared in step (d) while maintaining a temperature in the composition above the precipitation point for the polyalkylene oxide film forming agent and less than about 55° C.

In the above method, step (a) is preferably conducted at a temperature of from about 10° C. to less than 70° C. and more preferably from about 18° C. to 30° C. and still more preferably from about 20° C. to 26° C.

In step (b), the solution forms a substantially uniform dispersion when there is no visible evidence of solids in the solution either as aggregates or as solid separation from the colloid as evidenced by particles collecting on the walls of the container, on the container bottom, etc. Visible evidence means evidence seen by the naked eye or the eye corrected for vision defects but without the use of microscopes or other aids to significantly enlarge the image of the solution.

Step (c) is preferably conducted at a temperature of from above about 55° C. to about 75° C. and more preferably from about 65° C. to 75° C. and still more preferably from about 68° C. to 75° C.

In step (d), the solution is preferably cooled to a temperature of from about 40° C. to less than about 55° C. and more preferably from about 45° C. to 50° C. and still more preferably from about 45° C. to 48° C. In another preferred embodiment, the solution is cooled in step (d) to a temperature from above the precipitation point for the polyalkylene oxide film forming agent to about 50° C.

Step (e) is preferably conducted at a temperature of from about 40° C. to less than 55° C. and even more preferably from about 45° C. to 50° C. and still more from about 45° C. to 48° C. Furthermore, step (e) is preferably conducted with mixing so as to form a homogenous solution at the controlled temperature range recited above. Such mixing is sufficiently complete so as to ensure against regions or zones having localized high temperature profiles within the solution which can lead to decomposition of some of the $LiPF_6$ in such zones or regions.

DETAILED DESCRIPTION OF THE INVENTION

As noted above, this invention is directed to a method for mixing $LiPF_6$ salt into an electrolyte solution suitable for forming a solid electrolyte composition while inhibiting decomposition of this salt. However, prior to discussing this invention in more detail, the following terms will first be defined.

Definitions

As used herein, the following terms have the definitions set forth below:

The term "lithium hexafluorophosphate" refers to the $LiPF_6$ salt and any hydrates thereof. Preferably, the lithium hexafluorophosphate salt is anhydrous.

The term "polyalkylene oxide film forming agent" refers to high molecular weight polyalkylene oxide materials which, when incorporated into the electrolyte solution, facilitate the formation of a solid electrolyte composition (film) upon curing of the solution on the surface of a substrate. The polyalkylene oxide film forming agent comprises repeating units of

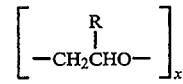

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000.

The polyalkylene oxide film forming agents can be homopolymers, copolymers, etc., including block copolymers, for example, block copolymers of ethylene oxide (R=H) and propylene oxide (R=—$CH_3$). Such polyalkylene oxide film forming agents are either commercially available or can be prepared by methods known in the art for polymerizing alkylene oxides.

The term "solid polymeric matrix" or "solid matrix" refers to an electrolyte compatible material formed by polymerizing a prepolymer and which, when used in combination with the other components of the electrolyte, renders the electrolyte solid. The solid matrix may or may not be ion-conducting. Preferably, however, the solid matrix is capable of ionically conducting $Li^+$ cations.

The term "prepolymers" refers to solid matrix forming monomers and/or partial polymers thereof.

The term "solid matrix forming monomers" refers to organic materials which in monomeric form can be polymerized to form solid polymeric matrices and which, when polymerized in the presence of $LiPF_6$, electrolyte solvent and polyalkylene oxide film forming agent, form solid matrices which are suitable for use as a solid electrolyte in an electrolytic cell. Suitable solid matrix forming monomers are well known in the art and the particular monomer employed is not critical.

Preferably, the solid matrix forming monomers contain hetero atom functionalities capable of forming donor acceptor bonds with the lithium cation of the $LiPF_6$ salt so as to render the solid matrix ion-conducting (i.e., able to conduct the $Li^+$). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the Li+.

Examples of suitable solid matrix forming monomers include, by way of example, ethyleneimine

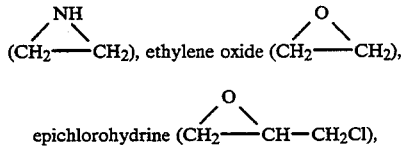

acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253 and incorporated herein by reference), acrylic acid ($CH_2=CHCOOH$), chloroacrylic acid ($ClCH=CHCOOH$), bromoacrylic acid ($BrCH=CHCOOH$), crotonic acid ($CH_3CH=CHCOOH$), propylene ($CH_3CH=CH_2$), ethylene ($CH_2=CH_2$) and the like as well as mixtures thereof.

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "cured" or "cured product" refers to the treatment of the electrolyte solution comprising a prepolymer, $LiPF_6$, polyalkylene oxide film forming agent and electrolyte solvent, under polymerization conditions so as to form a solid polymeric matrix. The resulting solid polymeric matrix is sometimes referred to herein as a "solid electrolyte composition" and the polymeric matrix of such solid electrolyte compositions can include cross-linking between polymer backbones.

Suitable polymerization conditions are well known in the art and include by way of example, heating the monomer, irradiating the monomer with UV light, electron beams, etc. The resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "electrolyte solvent" (or "electrolytic solvent") refers to the solvent (i.e., plasticizer) included in the solid electrolyte for the purpose of solubilizing the $LiPF_6$ during operation of the electrolytic cell and also to act as a plasticizer. The solvent can be any low volatile aprotic polar solvent. Preferably, these materials are characterized by a boiling point greater than about 85° C. In this regard, low volatility for the electrolyte solvent simplifies manufacture of the electrolyte and hence the electrolytic cell and improves the self-life of the resulting battery.

If the solid matrix forming monomer or partial polymer thereof employed in the electrolyte is cured or further cured by radiation polymerization to form the solid matrix, then the solvent should be radiation inert at least up to the levels of the radiation employed. If the solid matrix forming monomer or partial polymer thereof is cured by thermal polymerization to form the solid matrix, then the solvent should be thermally inert at least up to the temperature of thermal polymerization. Additionally, the solvent should not scavenge free radicals.

Representative examples of suitable electrolyte solvents include, by way of example, propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like. A preferred solvent is a mixture of an organic carbonate and triglyme, with a 4:1 mixture of propylene carbonate:triglyme being particularly preferred, as disclosed in U.S. patent application Ser. No. 07/918,509 filed on Jul. 22, 1992 and which is incorporated herein by reference in its entirety.

The term "electrolyte solution" refers to a non-cured composition comprising the $LiPF_6$ salt, the electrolyte solvent, the polyalkylene oxide film forming agent, and the prepolymer. The solution is preferably a liquid and even more preferably has a viscosity of from about 500 to about 10,000 centipoise at 25° C. and still more preferably has a viscosity of from about 1000 to about 4000 centipoise at 25° C.

The term "solid electrolytic cell" refers to a composite containing an anode, a cathode, and a solid ion-conducting electrolyte composition interposed therebetween. Preferably, the solid electrolytic cell is a secondary (rechargeable) cell.

The term "anode" refers to anodes comprising lithium including, by way of example, metallic lithium, lithium alloys such as alloys of lithium with aluminum, mercury, zinc, and the like, and intercalation based anodes employing lithium such as those based on carbon, tungsten oxides, and the like.

The cathode comprises a compatible cathodic material which refers to any material which functions as a positive pole (cathode) in a solid electrolytic cell. Such compatible cathodic materials are well known in the art and include, by way of example, manganese dioxide, molybdenum trioxide, vanadium oxides such as $V_2O_5$, $V_6O_{13}$, and $LiV_3O_8$ and the like, sulfides of titanium, molybdenum and niobium, and the like, chromium oxide, copper oxide, $LiCoO_2$, $LiMnO_2$, etc. The particular compatible cathodic material employed is not critical.

Methodology

The methods of this invention recite a process for the preparation of an electrolyte solution while inhibiting decomposition of the $LiPF_6$ in the solution. Specifically, the methods for forming the electrolyte solution described herein comprise the steps of:

(a) combining the electrolyte solvent and the prepolymer and mixing until homogeneous;

(b) adding the polyalkylene oxide film forming agent to the composition prepared in step (a) above and mixing until a substantially uniform dispersion is formed;

(c) heating the composition at a temperature above 55° C. until the polyalkylene oxide is dissolved;

(d) cooling the composition prepared in step (c) to a temperature above the precipitation point for the polyalkylene oxide film forming agent and less than about 55° C.; and (e) adding the $LiPF_6$ to the composition prepared in step (d) while maintaining a temperature in the composition above the precipitation point for the polyalkylene oxide film forming agent and less than about 55° C.

In a preferred embodiment, the resulting electrolyte solution comprises:

- from about 40 to 80 weight percent electrolyte solvent based on the weight of the electrolyte solution, preferably from about 60 to 80 weight percent, and even more preferably from about 60 to 70 weight percent;
- from about 5 to 30 weight percent of prepolymer based on the weight of the electrolyte solution, preferably from about 10 to 25 weight percent, and even more preferably from about 17 to 22 weight percent;
- from about 1 to 10 weight percent of a polyalkylene oxide film forming agent based on the weight of the electrolyte solution, preferably from about 1 to 5 weight percent, and even more preferably from about 2.5 to 3.5 weight percent; and
- from about 5 to about 25 weight percent of the $LiPF_6$ salt based on the weight of the electrolyte solution, preferably from about 7 to 15 weight percent, and even more preferably from about 9 to 11 weight percent.

The methods of this invention involve a first step of combining the electrolyte solvent and the prepolymer and mixing until homogeneous. Preferably, this is accomplished by combining the requisite amounts of the electrolyte solvent and the prepolymer and mixing these components until a homogeneous solution is formed at a temperature of from about 10° C. to less than 70° C. and more preferably from about 18° C. to 30° C. and still more preferably from about 20° C. to 26° C. The specific temperature employed is not critical and different temperatures within the above cited ranges can be employed for the combining and mixing aspects of this step (e.g., the combining step being conducted at 60° C. and the mixing step at 25° C.).

The addition step (b) is preferably conducted at room temperature (i.e., 18° C. to 28° C.) and mixing is continued until the solution forms a substantially uniform dispersion when there is no visible evidence of solids in the solution either as aggregates or as solid separation from the colloid as evidenced by particles collecting on the walls of the container, on the container bottom, etc.

After a substantially uniform dispersion is formed in step (b), the temperature of the dispersion is raised in step (c) to above 55° C. to initiate the dissolution of the polyalkylene oxide film forming agent. Preferably, the heating in step (c) is continued until the temperature of the dispersion is raised to between about 55° C. to 75° C. and more preferably between about 65° C. to 75° C. and still more preferably between about 68° C. to 75° C. The temperature of the dispersion is then maintained at this temperature while stirring until the polyalkylene oxide film forming agent is dissolved (i.e., a solution is formed).

After dissolution of the polyalkylene oxide film forming agent, the temperature of the solution is reduced to below 55° C. but above the temperature at which precipitation of the polyalkylene oxide film forming agent begins. While the exact temperature at which precipitation begins is a function of the electrolyte solvent and the concentration of components within the solvent, it has been found that this temperature is typically less than about 35° C. Accordingly, in a preferred embodiment, the solution is cooled in step (d) to a temperature of from about 40° C. to less than 55° C. and even more preferably from about 45° C. to 50° C. and still more from about 45° C. to 48° C. Surprisingly, it has been found that the cooled solution formed in step (d) can be maintained within the above cited temperature range for up to about 24 hours without precipitation of the polyalkylene oxide film forming agent which allows more than adequate time to conduct step (e).

Step (e) involves the addition of the $LiPF_6$ salt to the solution prepared in step (d). This step is achieved by maintaining a temperature of the solution above the precipitation point for the polyalkylene oxide film forming agent and less than about 55° C. while carefully adding this salt to avoid unintended heat increases due to the heat of solvation for the $LiPF_6$. Preferably, the temperature increase in the solution can be minimized by the slow addition of the $LiPF_6$ salt coupled with thorough stirring of the solution to prevent localized temperature increases. In this regard, a thermocouple is preferably placed into the interior of the solution as well as on or at the container surface so as to measure temperature uniformity of the solution. Sufficient stirring or mixing is employed so as to ensure against regions or zones having localized high temperature profiles within the solution which can lead to decomposition of some of the $LiPF_6$ in such zones or regions. External cooling means can also be employed to maintain temperature control of the solution during mixing.

In another preferred embodiment, the temperature of the solution is maintained at from about 45° to 50° C. and still more from about 45° to 48° C. during this addition step.

Upon completion of the $LiPF_6$ salt to the solution, the electrolyte solution is ready for use in forming a solid electrolyte composition. Surprisingly, it has been found that after addition of this salt, the solution remains stable (i.e., the polyalkylene oxide film forming agent does not precipitate) within the above cited temperature ranges for a period of up to 168 hours which allows ample time to form the solid electrolyte composition.

The solid electrolyte composition is formed by uniformly coating the electrolyte solution prepared by the above methods onto a suitable substrate (e.g., aluminum foil, a glass plate, a lithium anode, a cathode, etc.) by means of a roller, a doctor blade, a bar coater, a silk screen or spinner to obtain a film of the solution. In some cases, it may be necessary to heat the solution so as to reduce the viscosity of the solution thereby providing for a coatable material.

Preferably, the amount of electrolyte solution coated onto the substrate is an amount sufficient so that after curing, the resulting solid electrolyte composition has a thickness of no more than about 250 microns ($\mu m$). More preferably, the thickness of the cured solid electrolyte composition is from about 25 to about 250 microns, even more preferably from about 50 to about 150 microns, and still more preferably from about 50 to 80 microns.

The composition is then cured by conventional methods to form the solid electrolyte. For example, when the prepolymer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like. When curing is by UV radiation, the initiator is typically benzophenone, Darocur 1173 (Ciba Geigy, Ardsley, New York), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

The resulting electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

The following examples are offered to illustrate the present invention and should not be construed in any way as limiting its scope.

COMPARATIVE EXAMPLE A

The purpose of this example is to demonstrate that mixing the $LiPF_6$ salt, the electrolyte solvent, the prepolymer and the polyalkylene oxide film forming agent together followed by heating the mixture to effect dissolution of the film forming agent can result in decomposition of the $LiPF_6$ salt. Specifically, in this example, 14,612 kilograms of a mixture containing 60.09 weight percent of propylene carbonate, 15.02 weight percent of triglyme [$CH_3CH_2OCH_2CH_2OCH_2CH_2OCH_2CH_3$], and 24.89 weight percent of urethane acrylate (Photomer 6140, available from Henkel Corporation, Coating and Chemical Division, Ambler, PA) were combined and mixed at room temperature until homogeneous. Optionally, the resulting solution can be passed through a column of Inhibitor Remover (available as Product No. 31,133-2 from Aldrich Chemical, Milwaukee, Wisconsin) to remove inhibitor in the solution. In any event, the solution was then passed through a column of 4-5A molecular sieves to remove water and the resulting solution was again mixed at room temperature until homogeneous.

At this point, 568 grams of a polyethylene oxide film forming agent having a number average molecular weight of about 600,000 (available as Polyox WSR-205 from Union Carbide Chemicals and Plastics, Danbury, CT) was added to the solution and then dispersed. After dispersion, 1.822 kilograms of $LiPF_6$ was added to the solution while stirring with a laboratory mixer (Lightin Labmaster Mixer, available from Cole-Parmer, Niles, Illinois) over a period of about 120 minutes.

The resulting solution contained the following:

| Component | Amount | Weight Percent[a] |
|---|---|---|
| Propylene Carbonate | 8.780 kg | 51.64 |
| Triglyme | 2.194 kg | 12.91 |
| Urethane Acrylate | 3.636 kg | 21.39 |
| $LiPF_6$ | 1.822 kg | 10.72 |
| PEO Film Forming Agent | 0.568 kg | 3.34 |
| Total | 17 kg | 100 |

[a]weight percent based on the total weight of the electrolyte solution (17 kg)

The mixture was heated to about 74° C. while mixing for approximately 90 minutes to effect dissolution of the film forming agent. The electrolyte solution was degassed and then allowed to sit overnight at ambient conditions. The electrolyte solution was then recovered and the resulting solution was a dark yellow to brown indicating that substantial decomposition of the $LiPF_6$ salt occurred during this process.

The results of this example illustrate that the addition of the $LiPF_6$ salt prior to dissolving the polyalkylene oxide film forming agent can result in substantial levels of thermal decomposition of this salt.

COMPARATIVE EXAMPLE B 5,164 kilograms of propylene carbonate, 1.291 kilograms of triglyme, and 2.139 kilograms of urethane acrylate (Photomer 6140, available from Henkel Corp., Coating and Chemical Division, Ambler, PA) were combined at room temperature until homogeneous. The resulting solution was passed through a column of 4-5A molecular sieves to remove water and then thoroughly mixed at room temperature until homogeneous.

At this point, 0.334 kilograms of polyethylene oxide film forming agent having a number average molecular weight of about 600,000 (available as Polyox WSR-205 from Union Carbide Chemicals and Plastics, Danbury, CT) was added to the solution and then dispersed while stirring with a laboratory mixer (Lightin Labmaster Mixer, available from Cole-Parmer, Niles, Illinois) over a period of about 120 minutes.

After dispersion, the solution was heated to 55° C. with stirring until the film forming agent dissolved. The solution was maintained at a temperature of $\leq 55°$ C. by cooling and then 1.072 kilograms of $LiPF_6$ was added to the solution over a 40 to 45 minute period while thoroughly mixing to ensure a substantially uniform temperature profile throughout the solution.

The resulting solution contained the following:

| Component | Amount | Weight Percent[a] |
|---|---|---|
| Propylene Carbonate | 5.164 kg | 51.64 |
| Triglyme | 1.291 kg | 12.91 |
| Urethane Acrylate | 2.139 kg | 21.39 |
| $LiPF_6$ | 1.072 kg | 10.72 |
| PEO Film Forming Agent | 0.334 kg | 3.34 |
| Total | 10 kg | 100 |

[a]weight percent based on the total weight of the electrolyte solution (10 kg)

This solution was then degassed to provide for an electrolyte solution with a light yellow color evidencing $LiPF_6$ salt decomposition albeit at reduced levels as compared to the results of Comparative Example A.

The purpose of the following Example is to illustrate that the methods of this invention inhibit $LiPF_6$ salt decomposition during preparation of the electrolyte solution as evidence by the preparation of a clear electrolyte solution.

EXAMPLE 1

56.51 grams of propylene carbonate, 14.13 grams of triglyme, and 17.56 grams of urethane acrylate (Photomer 6140, available from Henkel Corp., Coating and Chemical Division, Ambler, PA) were combined at room temperature until homogeneous. The resulting solution was passed through a column of 4-5A molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, CT) was added to the solution and then dispersed while stirring with a magnetic stirrer over a period of about 120 minutes. After dispersion, the solution was heated to between 60° C. and 65° C. with stirring until the film forming agent dissolved. The solution was cooled to a temperature of between 45° and 48° C., a thermocouple was placed at the edge of the vortex created by the magnetic stirrer to monitor solution temperature, and then 9.24 grams of $LiPF_6$ was added to the solution over a 120 minute period while thoroughly mixing to ensure a substantially uniform temperature profile throughout the solution. Cooling was applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, CA.

The resulting solution contained the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a] weight percent based on the total weight of the electrolyte solution (100 g)

This solution was then degassed to provide for an electrolyte solution which was clear and had no yellow color evidencing little, if any, $LiPF_6$ salt decomposition.

Optionally, solutions produced as above and which contains the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 μm at 100% efficiency.

EXAMPLE 2

The purpose of this invention is to illustrate another embodiment of the methods of this invention. Specifically, in this example, the mixing procedure is conducted using the following weight percent of components:

| Propylene Carbonate | 52.472 weight percent |
|---|---|
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[a] (Photomer 6140, available from Henkel Corp., Coating and Chemical Division, Ambler, PA)
[b] polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over lithium free sodium 4A molecular sieves (Grade 514, 8-12 Mesh from Schoofs Inc., Moraga, CA) and then proceed to step 4.
2. Dry the propylene carbonate and triglyme over lithium free sodium 4A molecular sieves (Grade 514, 8-12 Mesh from Schoofs Inc., Moraga, CA).
3. At room temperature, <30° C., add the urethane acrylate to the solvent prepared in step 2. Stir at 300 rpm until the resin is completely dissolved. The solution should be clear and colorless.
4. Dry and then sift the polyethylene oxide film forming agent through a 25 mesh mini-sieve commercially available as Order No. 57333-965 from VWR Scientific, San Francisco, CA. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C).
5. After final addition of the polyethylene oxide film forming agent, stir an additional 30 minutes to ensure that the film forming agent is substantially dispersed.
6. Heat the mixture to 68° C. to 75° C. and stir until the film forming agent has melted and the solution has become transparent to light yellow in color. Optionally, in this step, the mixture is heated to 65° C. to 68° C.
7. Cool the solution produced in step 6 and when the temperature of the solution reaches 40° C., add the $LiPF_6$ salt very slowly making sure that the maximum temperature does not exceed 55° C.
8. After the final addition of the $LiPF_6$ salt, stir for an additional 30 minutes, degas, and let sit overnight and cool.
9. Filter the solution through a sintered stainless steel screen having a pore size between 1 and 50 μm at 100% efficiency.

At all times, the temperature of the solution should be monitored with a thermocouple which should be placed in the vortex formed by the mixer.

EXAMPLE 3

The purpose of this example is to illustrate methods which could be used for the preparation of a solid battery containing a solid electrolyte prepared using the method of this invention.

Specifically, a solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

84.4 weight percent of carbon powder (Shawinigan Black ™—available from Chevron Chemical Company, San Ramon, CA)

337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)

578.0 weight percent of isopropanol

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3 \times 10^4$ grams per cm$^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs. of carbon powder (Shawinigan Black TM —available from Chevron Chemical Company, San Ramon, CA) with 100 lbs. of a 25 weight percent solution of polyacrylic acid (average molecular weight of about 240,000, commercially available from BF Goodrich, Cleveland, Ohio, as Good-Rite K702—contains about 25 lbs. polyacrylic acid and 75 lbs. water) and with 18.5 lbs. of isopropanol. Stirring is done in a 30 gallon polyethylene drum with a gear-motor mixer (e.g., Lightin Labmaster Mixer, model XJ-43, available from Cole-Parmer Instruments Co., Niles, Illinois) at 720 rpm with two 5 inch diameter A310-type propellers mounted on a single shaft. This wets down the carbon and eliminates any further dust problem. The resulting weight of the mixture is 143.5 lbs. and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, FL) indicates that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, CA) with a 4 inch diameter Jiffy-Mixer brand impeller (such as an impeller available as Catalog No. G-04541-20 from Cole Parmer Instrument Co., Niles, Illinois). Then, it is gear pumped through a 25 μm cloth filter (e.g., So-Clean Filter Systems, American Felt and Filter Company, Newburgh, NY) and Meyer-rod coated and further treated as described above.

B. The Cathode

The cathode is prepared from a cathodic paste which, in turn, is prepared from a cathode powder as follows:

i. Cathode Powder

The cathode powder is prepared by combining 90.44 weight percent V$_6$O$_{13}$ [prepared by heating ammonium metavanadate (NH$_4^+$VO$_3^1$) at 450° C. for 16 hours under N$_2$ flow] and 9.56 weight percent of carbon (from Chevron Chemical Company, San Ramon, CA under the tradename of Shawinigan Black TM ). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent V$_6$O$_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, PA), and about 7.6 grams of ethoxylated trimethylolpropane triacylate (TMPEOTA) (molecular weight about 450 available as SR-454 from Sartomer Company, Inc., Exton, PA) in a double planetary mixer (Ross #2 mixer available from Charles Ross & Sons, Company, Hauppag, New York).

A propeller mixture is inserted into the double planetary mixer and the resulting mixture is stirred at a 150 rpms until homogeneous. The resulting solution is then passed through sodiated 4A molecular sieves. The solution is then returned to the double planetary mixer equipped with the propeller mixer and about 5 grams of polyethylene oxide (number average molecular weight about 600,000 available as Polyox WSR-205 from Union Carbide Chemicals and Plastics, Danbury, CT) are added to the solution vortex from by the propeller by a mini-sieve such as a 25 mesh mini-sieve commercially available as Order No. 57333-965 from VWR Scientific, San Francisco, CA.

The solution is then heated while stirring until the temperature of the solution reaches 65° C. At this point, stirring is continued until the solution is completely clear. The propeller blade is removed and the carbon powder prepared as above then is added as well as an additional 28.71 grams of unground carbon (from Chevron Chemical Company, San Ramon, CA under the tradename of Shawinigan Black TM ). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES", which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns ($\mu$m) with a conventional plate and roller system and is cured by continuously passing the sheet through an electron beam apparatus (Electrocurtain, Energy Science Inc., Woburn, MA) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, PA) are combined at room temperature and mixed until homogeneous. The resulting solution is passed through a column of 4A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, CT) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, CA.

The resulting solution contains the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a]weight percent based on the total weight of the electrolyte solution (100 g)

This solution is then degassed to provide for an electrolyte solution wherein little, if any, of the $LiPF_6$ salt decomposes.

Optionally, solutions produced as above and which contains the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 $\mu$m at 100% efficiency.

Alternatively, the electrolyte solution can be prepared in the following manner. Specifically, in this example, the mixing procedure is conducted using the following weight percent of components:

| | |
|---|---|
| Propylene Carbonate | 52.472 weight percent |
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

The mixing procedure employs the following steps:
1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, CA) and then proceed to step 4.
2. Dry the propylene carbonate and triglyme over sodiated 4A molecular sieves (Grade 514, 8–12 Mesh from Schoofs Inc., Moraga, CA).
3. At room temperature, <30° C., add the urethane acrylate to the solvent prepared in step 2. Stir at 300 rpm until the resin is completely dissolved. The solution should be clear and colorless.
4. Dry and then sift the polyethylene oxide film forming agent through a 25 mesh mini-sieve commercially available as Order No. 57333-965 from VWR Scientific, San Francisco, CA. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).
5. After final addition of the polyethylene oxide film forming agent, stir an additional 30 minutes to ensure that the film forming agent is substantially dispersed.
6. Heat the mixture to 68° C. to 75° C. and stir until the film forming agent has melted and the solution has become transparent to light yellow in color. Optionally, in this step, the mixture is heated to 65° C. to 68° C.
7. Cool the solution produced in step 6 and when the temperature of the solution reaches 40° C., add the LiPF$_6$ salt very slowly making sure that the maximum temperature does not exceed 55° C.
8. After the final addition of the LiPF$_6$ salt, stir for an additional 30 minutes, degas, and let sit overnight and cool.
9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte solution is then coated by a conventional knife blade to a thickness of about 50 μm onto the surface of the cathode sheet prepared as above (on the side opposite that of the current collector) but without the Mylar covering. The electrolyte solution is then cured by continuously passing the sheet through an electron beam apparatus (Electrocurtain, Energy Science Inc., Woburn, MA) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, North Carolina.

E. The Solid Electrolytic Cell

A sheet comprising a solid battery is prepared by laminating the lithium foil anode to the surface of the electrolyte in the sheet produced in step C above. Lamination is accomplished by minimal pressure.

What is claimed is:

1. A method for preparing an electrolyte solution comprising an electrolyte solvent, a polyalkylene oxide film forming agent, a prepolymer and LiPF$_6$ salt while inhibiting decomposition of the LiPF$_6$ salt which method comprises the steps of:
   (a) combining the electrolyte solvent and the prepolymer and mixing until homogeneous;
   (b) adding the polyalkylene oxide film forming agent to the composition prepared in step (a) above and mixing until a uniform dispersion is formed as evidenced by the lack of solids visible in the dispersion;
   (c) heating the composition produced in step (b) above at a temperature above 55° C. until the polyalkylene oxide is dissolved;
   (d) cooling the composition prepared in step (c) to a temperature above the precipitation point for the polyalkylene oxide film forming agent to 50° C.; and
   (e) adding the LiPF$_6$ to the composition prepared in step (d) while maintaining the temperature in said composition above the precipitation point for the polyalkylene oxide film forming agent and less than 55° C. so as to form an electrolyte solution.

2. The method according to claim 1 wherein step (c) is conducted at a temperature of from above 55° C. to about 75° C.

3. The method according to claim 2 wherein step (c) is conducted at a temperature of from about 68° C. to about 75° C.

4. The method according to claim 2 wherein the composition is cooled in step (d) to a temperature of from about 45° C. to 50° C.

5. The method according to claim 4 wherein, during step (e), the composition is suitably stirred so as to ensure against regions or zones having localized high temperature profiles within the composition.

6. The method according to claim 1 wherein the solvent is a mixture of propylene carbonate and triglyme.

7. The method according to claim 6 wherein the solvent is approximately a 4:1 mixture, based on weight, of propylene carbonate and triglyme.

8. The method according to claim 1 wherein the film forming agent is a polyethylene oxide having a number average molecular weight of at least 100,000.

9. The method according to claim 1 wherein the prepolymer is urethane acrylate having from 1 to 4 acrylate groups.

10. A method for preparing an electrolyte solution comprising an electrolyte solvent, a polyalkylene oxide film forming agent, a prepolymer and LiPF$_6$ salt while inhibiting decomposition of the LiPF$_6$ salt which method comprises the steps of:
   (a) combining the electrolyte solvent and the prepolymer and mixing until homogeneous;
   (b) adding the polyalkylene oxide film forming agent to the composition prepared in step (a) above and mixing until a uniform dispersion is formed as evidenced by the lack of solids visible in the dispersion;
   (c) heating the composition produced in step (b) above at a temperature above 55° C. until the polyalkylene oxide is dissolved;
   (d) cooling the composition prepared in step (c) to a temperature above the precipitation point for the polyalkylene oxide film forming agent to 50° C.; and (e) adding the LiPF$_6$ to the composition prepared in step (d) while maintaining the temperature in said composition from 45° C. to 50° C. so as to form an electrolyte solution wherein the electrolyte solution produced in step (e) comprises from about 40 to 80 weight percent electrolyte solvent, from about 5 to 30 weight percent of prepolymer, from about 1 to 10 weight percent of polyalkylene oxide film forming agent, and from about 5 to 25 weight percent of the LiPF$_6$ salt each based on the total weight of the electrolyte solution.

11. The method according to claim 10 wherein step (c) is conducted at a temperature of from about 68° C. to about 75° C.

12. The method according to claim 10 wherein, during step (e), the composition is suitably stirred so as to ensure against regions or zones having localized high temperature profiles within the composition.

13. The method according to claim 10 wherein the solvent is a mixture of propylene carbonate and triglyme.

14. The method according to claim 13 wherein the solvent is approximately a 4:1 mixture, based on weight, of propylene carbonate and triglyme.

15. The method according to claim 10 wherein the film forming agent is a polyethylene oxide having a number average molecular weight of at least 100,000.

16. The method according to claim 10 wherein the prepolymer is urethane acrylate having from 1 to 4 acrylate groups.

17. A method for preparing an electrolyte solution comprising an electrolyte solvent which is a mixture of triglyme and propylene carbonate or ethylene carbonate, a polyethylene oxide film forming agent having a number average molecular weight of from about 500,000 to about 750,000, a urethane acrylate prepolymer having a molecular weight of from about 500 to about 30,000 and from 1 to 4 acrylate groups, and LiPF$_6$ salt while inhibiting decomposition of the LiPF$_6$ salt which method comprises the steps of:

(a) combining the electrolyte solvent and the prepolymer and mixing until homogeneous;

(b) adding the polyethylene oxide film forming agent to the composition prepared in step (a) above and mixing until a uniform dispersion is formed as evidenced by the lack of solids visible in the dispersion;

(c) heating the composition produced in step (b) above at a temperature above 55° C. until the polyethylene oxide is dissolved;

(d) cooling the composition prepared in step (c) to a temperature above the precipitation point for the polyethylene oxide film forming agent to 50° C.; and (e) adding the LiPF$_6$ to the composition prepared in step (d) while maintaining the temperature in said composition above the precipitation point for the polyethylene oxide film forming agent and less than 55° C. so as to form an electrolyte solution wherein the electrolyte solution produced in step (e) comprises from about 40 to 80 weight percent electrolyte solvent, from about 5 to 30 weight percent of prepolymer, from about 1 to 10 weight percent of polyethylene oxide film forming agent, and from about 5 to 25 weight percent of the LiPF$_6$ salt each based on the total weight of the electrolyte solution.

18. The method according to claim 17 wherein step (c) is conducted at a temperature of from about 68° C. to about 75° C.

19. The method according to claim 17 wherein the electrolyte solvent is approximately a 4:1 mixture, based on weight, of propylene carbonate and triglyme.

* * * * *